March 7, 1961 J. L. LANG ET AL 2,974,125
COPOLYMERS OF METHYL METHACRYLATE POSSESSING
GOOD ELONGATION VALUES
Filed Aug. 24, 1953
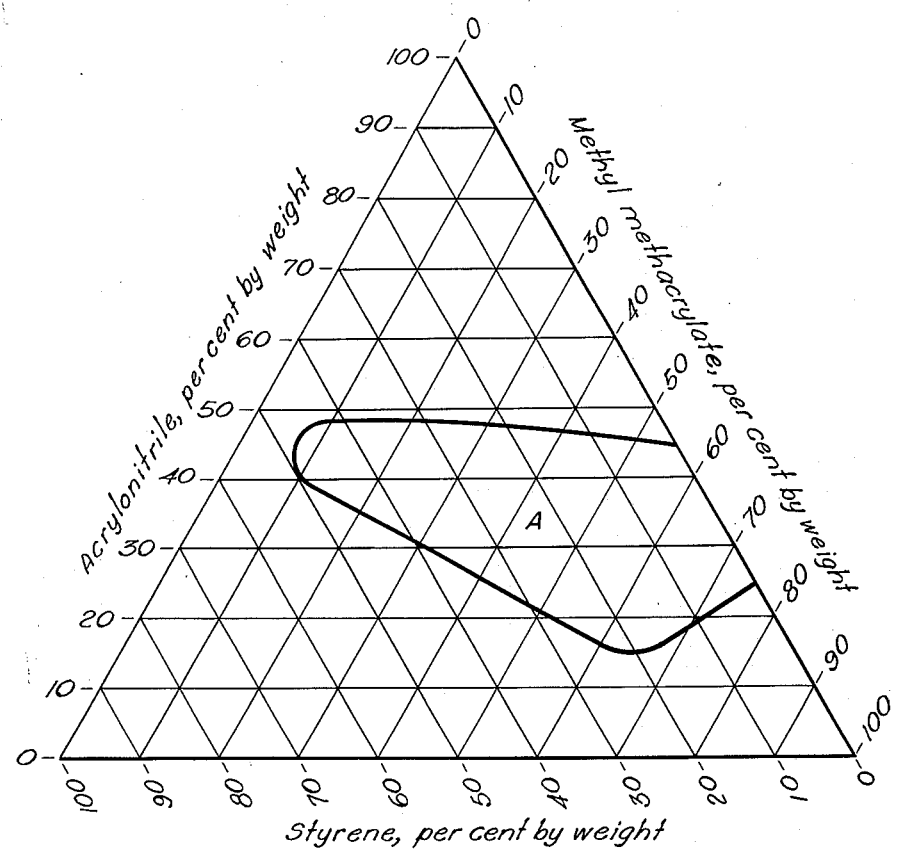
INVENTORS:
John L. Lang
Clifford Jones
Arthur F. Roche
Frank L. Ingley
BY *Griswold & Burdick*
ATTORNEYS

United States Patent Office 2,974,125
Patented Mar. 7, 1961

2,974,125

COPOLYMERS OF METHYL METHACRYLATE POSSESSING GOOD ELONGATION VALUES

John L. Lang, Midland, Clifford Jones, Linwood, Arthur F. Roche, Freeland, and Frank L. Ingley, Midland, Mich., assignors to The Dow Chemical Company, Midland, Mich., a corporation of Delaware Filed Aug. 24, 1953, Ser. No. 376,168

4 Claims. (Cl. 260—80.5)

This invention pertains to certain new moldable copolymers of methyl methacrylate which are characterized by high ultimate elongations, and to a method of making the same.

For use in making rigid articles by compression or injection molding of synthetic resins it is desirable that the material employed be a high molecular weight, thermoplastic polymer which at room temperature is hard, strong and tough. One common fault of many otherwise satisfactory plastics is that moldings made therefrom break at a low degree of elongation. This fault is frequently manifest by failure of plastic parts subjected to moderate stretch or bending such as molded-in catches on plastic boxes, thin sections in moldings, press-fitted plastic parts, etc. Failure due to over-elongation is frequently seen as cracks around metal inserts molded or pressed into plastic parts.

Examples of known thermoplastic resins which are clear and transparent and possess good strength and good molding characteristics, but which have low elongation values which limit their utility are polystyrene, polymethylmethacrylate, and copolymers of styrene and methylmethacrylate. The elongation values at the breaking point of these common plastics is usually in the range of from 3 to 4 percent with 5 percent being exceptional. Although such polymers can be plasticized to increase the elongation values, this usually impairs one or more of the other desirable properties, e.g. the tensile strength or clarity, of the polymers.

It is an object of this invention to provide certain new thermoplastic copolymers having desirable properties similar to those of the aforementioned known polymers and, in addition thereto, possessing relatively high percent elongation values. A further object is to provide a method of making the new copolymers. Other objects and advantages will be evident from the following description of the invention.

It has now been discovered that certain copolymers of methyl methacrylate and acrylonitrile, and of methyl methacrylate, styrene and acrylonitrile, when prepared by a method hereinafter described, are high molecular weight, moldable, strong thermoplastic compositions characterized by relatively high ultimate elongations.

The accompanying drawing is a composition diagram for the system methyl methacrylate, acrylonitrile and styrene in which the area labled "A" and enclosed by the curved line designates the compositions of this invention, i.e. copolymers having methyl methacrylate, acryonitrile and styrene chemically combined therein in the proportions represented by area A, which compositions have ultimate elongations at break of 10 percent or more. Area "A" of the drawing lies within the range of compositions whose limits are described approximately as follows:

Methyl methacrylate=5–75 percent by weight;
Acrylonitrile=15–50 percent by weight;
Styrene=0–50 percent by weight;

and within which limits the proportion of acrylonitrile is further related to the proportions of styrene and methyl methacrylate as follows:

The weight percent of acrylonitrile is greater than:

(a) The weight percent styrene less 10 percent;
(b) The weight percent methyl methacrylate less 55 percent.

A copolymer of this invention is made by heating a mixture of the monomeric polymerizable substances and the copolymeric product thereof in bulk, i.e. in the substantial absence of other polymerizable substances, soluble diluents or insoluble materials, at a pressure sufficient to preserve the liquid state, at a polymerization temperature between about 130° C. and about 155° C. while feeding to the mixture the monomeric polymerizable substances at a rate such as to maintain in the mixture a constant ratio of the polymerizable substances to each other and to maintain the proportion of copolymer in the mixture constant at not more than about 50 percent by weight.

These conditions are readily attained by feeding continuously and at steady rates the monomeric polymerizable substances or a mixture thereof to a reaction mixture in a reaction zone at a polymerization temperature between about 135° C. and about 155° C. while continuously withdrawing from the reaction zone a portion of the reaction mixture at a rate corresponding to the rate of feed of the monomeric substances. When equilibrium is attained in such a system, the ratio of monomeric substances to each other in the reaction zone is substantially constant, the proportion of polymer in the reaction mixture is substantially constant, and the chemical composition of the copolymer product is also substantially constant. However, the relative proportions in which the polymerizable substances are chemically combined in the copolymer are not necessarily the same as the relative proportions of the monomeric substances in the mixture from which the copolymer was formed. The proportions of monomeric polymerizable substances which are necessary in a feed mixture thereof in order to produce a copolymer product having a particular proportion of reactants chemically combined therein can readily be determined by preliminary tests. The polymerization reaction is preferably carried out in the absence of added catalyst, although a minor amount of a free-radical generating catalyst, e.g. an organic peroxygen compound, may be added to the polymerization reaction mixture if desired.

It is desirable that the polymerization in the above-described method be carried to a relatively low degree of conversion, i.e. that the polymerization mixture contain not more than 50 percent by weight of copolymer product.

The copolymer product can be separated from the unpolymerized components of the polymerization reaction mixture by any conventional means, e.g. by precipitation of the copolymer in a non-solvent liquid with which the unpolymerized components are miscible. Preferably the polymerization reaction mixture is heated, usually under reduced pressure, to vaporize and remove the volatile non-polymeric material and to obtain the copolymer product as a residue.

Although the above-described method can be applied to the making of copolymers of methyl methacrylate, acrylonitrile and styrene in any desired proportion thereof, the copolymers having chemically combined therein methyl methacrylate, acrylonitrile and styrene in the proportions represented by area "A" of the drawing are particularly outstanding. The copolymers of composition represented by area "A" have ultimate elongations of more than 10 percent up to about 40 percent. Yet these copolymers have high tensile strengths ranging from about 9,000 to more than 12,000 pounds per square inch. They are thermoplastic materials capable of being molded, e.g. by compression or injection molding procedures, extruded, hot-shaped, drawn, machined, welded, etc. into useful articles. Because of the higher elongation values of these copolymers, articles made therefrom are less liable to failure when subjected to bending or stretching forces. Parts made of these polymers may more widely be employed in pressed-fit applications or used with metal inserts, screws, etc. However, where high elongation values are not required, the method of this invention can be used to make valuable products outside of the preferred range of composition.

The invention will now be illustrated with examples which should not be construed as limiting the invention. Some parts of the examples, for purposes of contrast, are outside the scope of the invention. In the examples, parts and percentages are by weight unless otherwise specified.

time to time, samples were taken of the polymerization mixture and of the polymeric product and tests and analysis were made in conventional manner.

In Table I are shown data collected from each of several experiments, identified as runs 1–16, wherein a mixture of methyl methacrylate, acrylonitrile and styrene in the relative proportions shown for each run, was polymerized by the method hereinbefore described. For each run, the table also shows the composition of the resulting polymer product, the degree of conversion in terms of the concentration of polymer in the polymerization mixture in percent by weight, and the properties of the devolatilized polymer product. The tensile strength in pounds per square inch and the elongation in percent increase in length at break were determined in conventional manner on injection-molded test bars having a cross-section of ¼ by ⅛ inch. In the table, runs numbered 1–8 are examples of compositions within the scope of this invention, having ultimate elongations in excess of 10 percent. Runs numbered 9–16 are for purposes of contrast and show compositions outside the scope of this invention whose ultimate elongations are less than 10 percent.

These and similar data from analogous experiments were used to define the limits of area A of the drawing.

*Table I*

| Run No. | Monomer Composition [1] | | | Polymer Composition [1] | | | Conversion, Percent | Tensile Strength, p.s.i. | Elongation, Percent |
|---|---|---|---|---|---|---|---|---|---|
| | MMA | A | S | MMA | A | S | | | |
| 1 | 70 | 15 | 15 | 62 | 20 | 18 | 24.5 | 8830 | 13.4 |
| 2 | 50 | 25 | 25 | 44 | 28 | 28 | 24.2 | 8900 | 12.5 |
| 3 | 33⅓ | 33⅓ | 33⅓ | 30 | 34 | 36 | 28.0 | 9230 | 13.6 |
| 4 | 20 | 40 | 40 | 15 | 45 | 40 | 19.3 | 9130 | 21.5 |
| 5 | 25 | 65 | 10 | 46 | 39 | 15 | 15.5 | 9200 | 36.0 |
| 6 | 60 | 40 | | 71.5 | 28.5 | | 32.5 | 12,100 | 25.2 |
| 7 | 50 | 50 | | 68.2 | 31.8 | | 17.0 | 11,800 | 23.0 |
| 8 | 40 | 60 | | 59.5 | 40.5 | | 21.1 | 12,870 | 25.9 |
| 9 | 65 | 35 | | 77.6 | 22.4 | | 21.6 | 11,930 | 5.1 |
| 10 | 10 | 55 | 35 | 9 | 55 | 36 | 17.8 | 8400 | 3.9 |
| 11 | 10 | 35 | 55 | 9 | 37 | 54 | 23.7 | 8670 | 4.6 |
| 12 | 25 | 50 | 25 | 26 | 50 | 24 | 13.1 | 9270 | 7.2 |
| 13 | 40 | 20 | 40 | 30 | 26 | 44 | 23.1 | 9070 | 4.8 |
| 14 | 55 | 10 | 35 | 50 | 20 | 30 | 19.8 | 8906 | 4.4 |
| 15 | | | 100 | | | 100 | 21.3 | 8300 | 3.1 |
| 16 | 100 | | | 100 | | | 10.4 | 9040 | 3.4 |

[1] Composition in percent by weight.
MMA = Methyl methacrylate.
A = Acrylonitrile.
S = Styrene.

EXAMPLE 1

Copolymerizations of methyl methacrylate, acrylonitrile and styrene were made in an apparatus arranged and operated as follows.

Means were provided for feeding continuously at a measured uniform rate a mixture of the monomeric polymerizable substances to a polymerization reaction mixture. The polymerization reaction mixture was contained in a loop of coiled pipe 32 feet long with an inside diameter of about 0.364 inch, the ends of which were connected to a pump for rapidly circulating the contents of the coil. The total volume of polymerization reaction mixture in the system was about 890 ml. Means were provided for maintaining the temperature of the polymerization mixture at about 140° C. At a point in the coil remote from the point of introduction of the feed mixture there was provided means for continuously withdrawing a portion of the polymerization mixture at the same rate as the rate of feed of the polymerizable mixture and under conditions such that the contents of the coil were kept in a liquid state. The withdrawn portion of the polymerization mixture was conducted to a devolatilizer where the mixture was heated at reduced pressure and the unreacted monomers were vaporized, leaving the polymeric product as a residue containing approximately one percent of volatile material. From

EXAMPLE 2

For purpose of showing the effect of temperature on the properties of the copolymer product of polymerization of a mixture of monomers under the conditions of this invention, several experiments were made using the procedure described in Example 1, except that each experiment was made at a different constant temperature. In separate runs, identified as 1–5, a mixture of equal parts by weight of monomeric methyl methacrylate and acrylonitrile was fed to a coil polymerizer and polymerized at a temperature of 120° C., 130° C., 140° C., 150° C., and 160° C., respectively. A portion of each polymerization mixture was withdrawn and devolatilized as previously described. In Table II are shown the data collected from these experiments, for each of which is shown the temperature of the polymerization, the composition of the resulting copolymer product, the degree of conversion in terms of the concentration of polymer in the polymerization mixture in percent by weight and the properties of the devolatilized copolymer product. The tensile strength in pounds per square inch and the elongation in percent increase in length at break were determined on injection-molded test bars having a cross-section of ¼ by ⅛ inch.

From these data it is evident that outstanding elongation values are obtained on copolymers made at temperatures between about 130° C. and about 155° C.

Table II

| Run No. | Temp., °C. | Copolymer Composition¹ | | Conversion, Percent | Tensile Strength, p.s.i. | Elongation, Percent |
|---|---|---|---|---|---|---|
| | | MMA | A | | | |
| 1 | 120 | 65.8 | 34.2 | 10.1 | 12,730 | 9.8 |
| 2 | 130 | 65.9 | 34.1 | 12.8 | 12,600 | 17.4 |
| 3 | 140 | 65.2 | 34.8 | 23.9 | 12,570 | 19.3 |
| 4 | 150 | 65.0 | 35.0 | 23.0 | 12,770 | 29.1 |
| 5 | 160 | 64.9 | 35.1 | 23.5 | 11,470 | 4.2 |

¹ Compositions in percent by weight.
MMA = Methyl methacrylate.
A = Acrylonitrile.

We claim:

1. A method of making a thermoplastic, moldable copolymer, characterized by an ultimate elongation of more than 10 percent, which comprises copolymerizing at least the first two of the monomeric compounds methyl methacrylate, acrylonitrile and styrene, in one of the proportions represented by points falling within and on the perimeter of area A on the annexed drawing, by heating a homogeneous liquid polymerization mixture consisting essentially of such monomeric compounds and the copolymer product of polymerization thereof at a polymerization temperature between about 130° C. and about 155° C., the proportion of copolymer product being from 10 to 50 percent by weight of the polymerization mixture, maintaining the proportions of monomeric compounds and the proportion of copolymer product in the polymerization mixture substantially constant at values within the above-stated limits of proportion, respectively, by feeding said monomeric compounds to the polymerization reaction mixture, and separating a copolymer product from at least a portion of the polymerization mixture.

2. A method of making a thermoplastic, moldable copolymer, characterized by an ultimate elongation of more than 10 percent, which comprises copolymerizing at least the first two of the monomeric compounds methyl methacrylate, acrylonitrile and styrene by heating a homogeneous liquid polymerization mixture consisting essentially of such monomeric compounds and the copolymer product of polymerization thereof in a polymerization reaction zone at a temperature between 130° C. and 155° C., the monomeric constituents being present in such proportions relative to one another that the copolymer product of polymerization thereof contains the monomeric constituents polymerically combined in one of the proportions represented by points falling within and on the perimeter of area A on the annexed drawing and the copolymer product being present in one of the proportions in the range from 10 to 50 percent by weight of the polymerization mixture, maintaining such proportions of monomeric constituents and of copolymer product in the polymerization mixture substantially constant at such specified proportions, respectively, by continuously feeding said monomeric compounds to the polymerization mixture, and maintaining the quantity of polymerization mixture in the polymerization reaction zone substantially constant by continuously withdrawing a representative portion of the polymerization mixture from the polymerization zone, and separating a copolymer product from the portion of the polymerization mixture so withdrawn.

3. A thermoplastic, moldable copolymer of monomers consisting of at least the first two of the compounds methyl methacrylate, acrylonitrile, and styrene polymerically combined in one of the proportions represented by points falling within and on the permieter of area A on the annexed drawing and characterized by an ultimate elongation of more than 10 percent, said copolymer having been made by the method of claim 1.

4. A thermoplastic, moldable copolymer of monomers consisting of at least the first two of the compounds methyl methacrylate, acrylonitrile, and styrene polymerically combined in one of the proportions represented by points falling within and on the perimeter of area A on the annexed drawing and charcterized by an ultimate elongation of more than 10 percent, said copolymer having been made by the method of claim 2.

References Cited in the file of this patent

UNITED STATES PATENTS

| 1,933,052 | Fikentscher et al. | Oct. 31, 1933 |
| 2,117,321 | Hill | May 17, 1938 |
| 2,123,599 | Fikentscher et al. | July 12, 1938 |
| 2,160,054 | Bauer et al. | May 30, 1939 |
| 2,412,034 | D'Alelio | Dec. 3, 1946 |
| 2,417,293 | D'Alelio | Mar. 11, 1947 |
| 2,486,241 | Arnold | Oct. 25, 1949 |
| 2,537,031 | Chaney | Jan. 9, 1951 |